(12) United States Patent
Ueno

(10) Patent No.: US 11,595,570 B2
(45) Date of Patent: Feb. 28, 2023

(54) IMAGE CAPTURE APPARATUS, INFORMATION PROCESSING APPARATUS AND CONTROL METHOD

(71) Applicant: CANON KABUSHIKI KAISHA, Tokyo (JP)

(72) Inventor: Daiyu Ueno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/318,627

(22) Filed: May 12, 2021

(65) Prior Publication Data
US 2021/0360150 A1 Nov. 18, 2021

(30) Foreign Application Priority Data

May 14, 2020 (JP) .............................. JP2020-085497

(51) Int. Cl.
*H04N 5/232* (2006.01)
*H04N 5/225* (2006.01)
(52) U.S. Cl.
CPC ..... *H04N 5/23225* (2013.01); *H04N 5/22525* (2018.08); *H04N 5/23206* (2013.01); *H04N 5/23219* (2013.01)
(58) Field of Classification Search
CPC ........... H04N 5/23225; H04N 5/22525; H04N 5/23206; H04N 5/23219; H04N 5/23216; H04N 5/232933
See application file for complete search history.

(56) References Cited

U.S. PATENT DOCUMENTS

| | | | |
|---|---|---|---|
| 2003/0135116 A1* | 7/2003 | Ogasawara | A61B 8/00 600/437 |
| 2009/0128844 A1* | 5/2009 | Kondo | G06F 3/1288 358/1.15 |
| 2012/0229411 A1* | 9/2012 | Arai | G06F 3/04817 345/173 |
| 2021/0248427 A1* | 8/2021 | Guo | G06V 10/82 |

FOREIGN PATENT DOCUMENTS

JP    2004053722 A    2/2004

* cited by examiner

*Primary Examiner* — Yogesh K Aggarwal
(74) *Attorney, Agent, or Firm* — Canon U.S.A., Inc. IP Division

(57) ABSTRACT

An image capture apparatus having a customizing function of assigning a predetermined shooting function to a predetermined operation member, comprises a memory and at least one processor which function as an acquisition unit configured to acquire shot image information obtained by a shooting operation of a user, and an estimation unit configured to estimate an operation member suitable for a customizing function to be recommended to a user as a result of executing an estimation processing based on the shot image information.

7 Claims, 15 Drawing Sheets

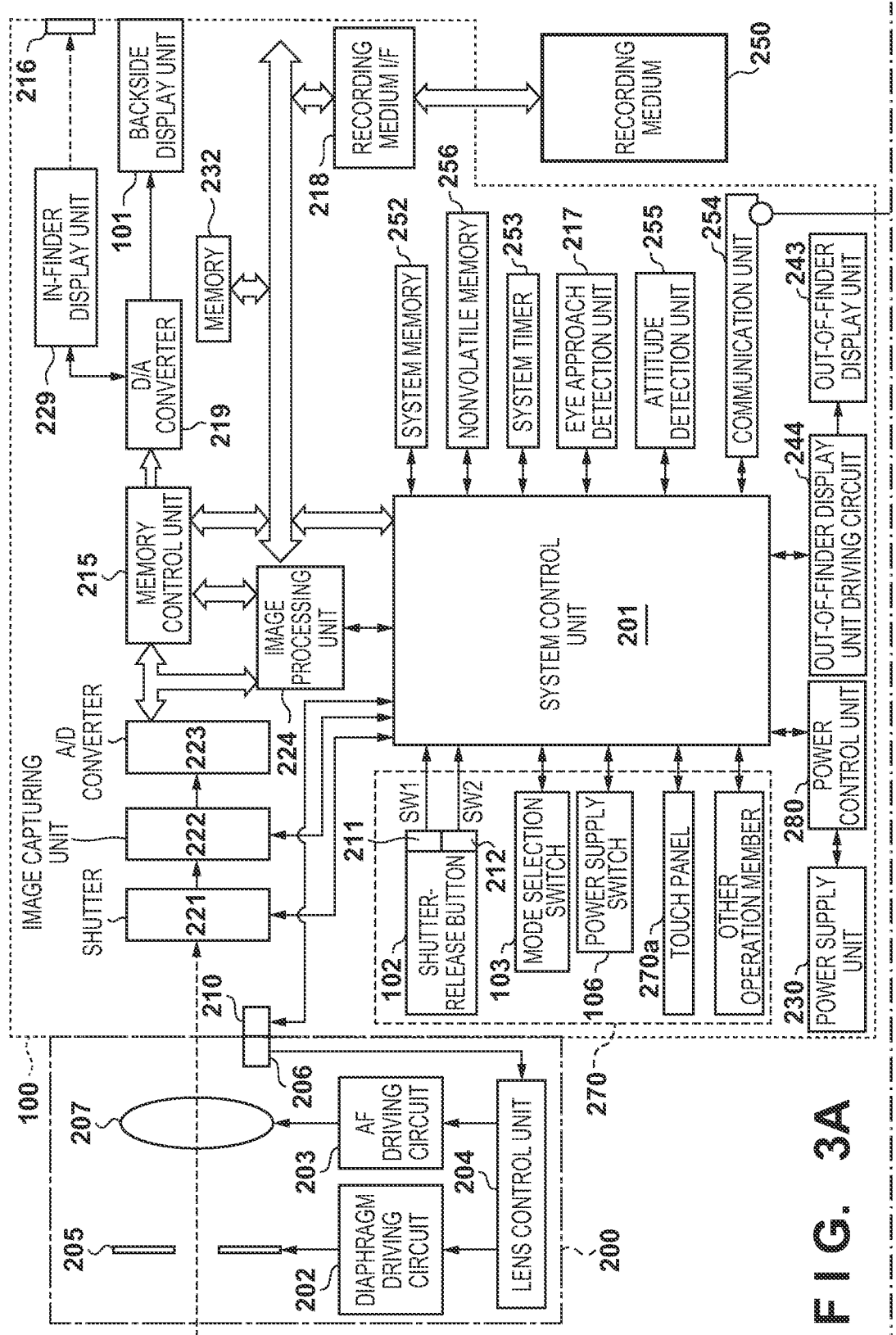
F I G. 3A

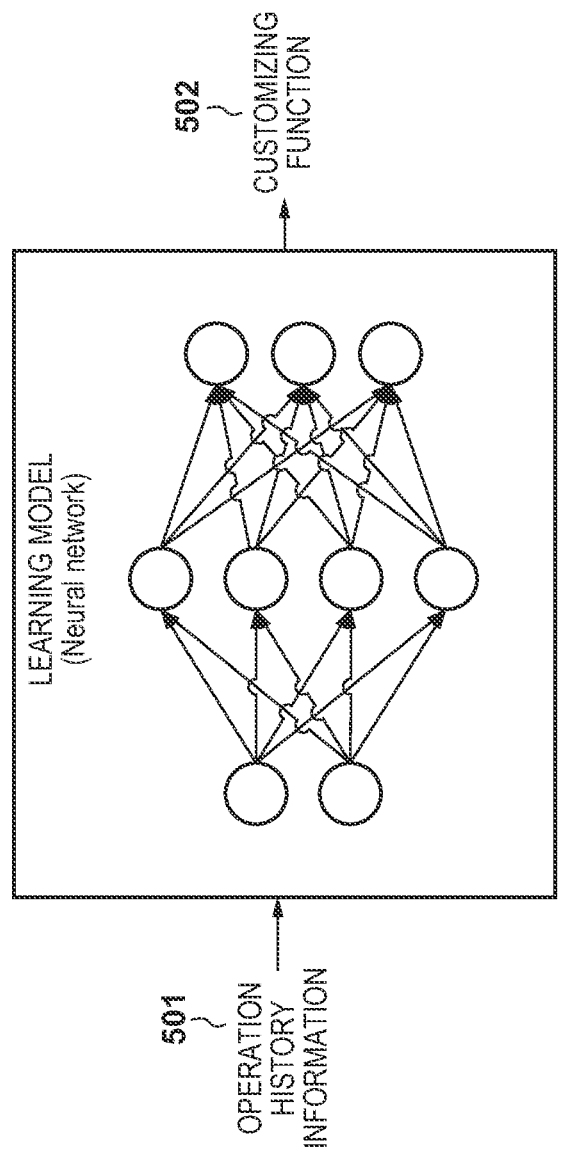

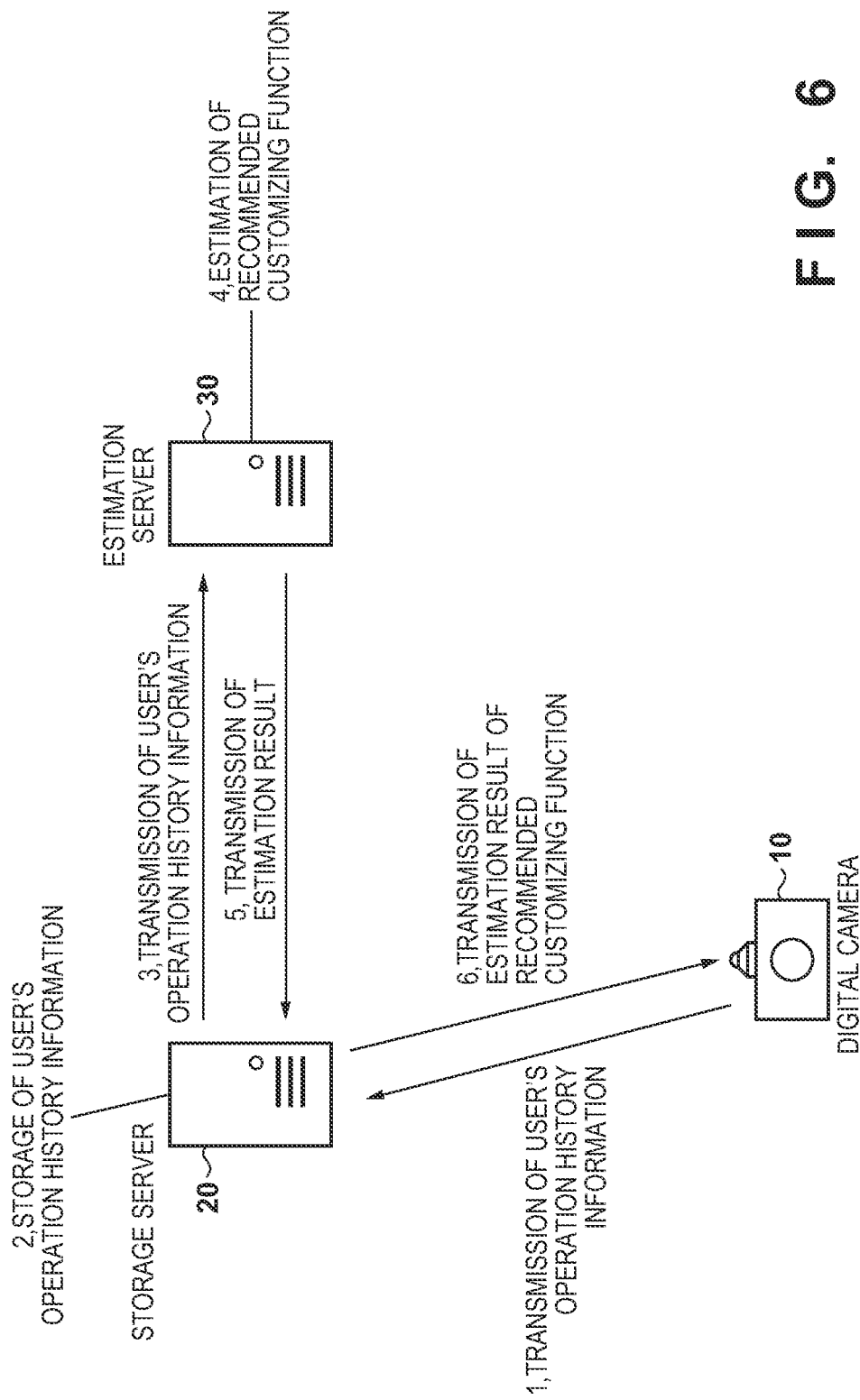

FIG. 11A-1

| | INPUT DATA | | | |
|---|---|---|---|---|
| NUMBER OF TIMES OF SHOOTING OF IMAGES WITH HIGHLIGHT-DETAIL LOSS | NUMBER OF TIMES OF HIGH ISO SENSITIVITY SETTINGS | NUMBER OF TIMES OF ZEBRA FUNCTION SETTING | NUMBER OF TIMES OF EXPOSURE CORRECTION FUNCTION SETTINGS | NUMBER OF TIMES OF CUSTOMIZING FUNCTION SETTINGS |
| 1 | 0 | 0 | 0 | 0 |
| 0 | 1 | 0 | 0 | 0 |
| 0 | 0 | 1 | 0 | 0 |
| 0 | 0 | 0 | 1 | 0 |
| 1 | 1 | 0 | 0 | 0 |
| 1 | 0 | 1 | 0 | 0 |
| 1 | 0 | 0 | 1 | 0 |
| 1 | 1 | 1 | 0 | 1 |
| 1 | 1 | 0 | 1 | 0 |
| 1 | 0 | 1 | 1 | 1 |
| 1 | 0 | 1 | 0 | 0 |
| 1 | 1 | 1 | 1 | 1 |
| 1 | 1 | 1 | 0 | 0 |
| 1 | 1 | 1 | 1 | 1 |
| 1 | 1 | 0 | 1 | 0 |
| 1 | 1 | 1 | 1 | 1 |

F I G. 11A-2

| CUSTOMIZING FUNCTION | SUPERVISORY DATA |
|---|---|
| | CORRELATION OF SUPERVISORY DATA TO INPUT DATA |
| ZEBRA FUNCTION | USER IS MORE LIKELY TO WANT TO KNOW ZEBRA FUNCTION |
| EXPOSURE CORRECTION FUNCTION | USER IS MORE LIKELY TO WANT TO KNOW THAT HIGHLIGHT-DETAIL LOSS CAN BE SUPPRESSED BY ADJUSTING EXPOSURE IN HIGH ISO SENSITIVITY |
| ZEBRA FUNCTION | USER IS MORE LIKELY TO WANT TO KNOW THAT ZEBRA FUNCTION CAN BE ASSIGNED TO CUSTOMIZING FUNCTION |
| EXPOSURE CORRECTION FUNCTION | USER IS MORE LIKELY TO WANT TO KNOW THAT EXPOSURE CORRECTION FUNCTION CAN BE ASSIGNED TO CUSTOMIZING FUNCTION |
| EXPOSURE CORRECTION FUNCTION | USER IS MORE LIKELY TO WANT TO KNOW THAT HIGHLIGHT-DETAIL LOSS CAN BE SUPPRESSED BY ADJUSTING EXPOSURE IN HIGH ISO SENSITIVITY |
| ZEBRA FUNCTION | USER IS MORE LIKELY TO WANT TO KNOW THAT ZEBRA FUNCTION CAN BE ASSIGNED TO CUSTOMIZING FUNCTION |
| ZEBRA FUNCTION | USER IS MORE LIKELY TO WANT TO KNOW ZEBRA FUNCTION |
| ZEBRA FUNCTION | USER IS MORE LIKELY TO WANT TO KNOW ZEBRA FUNCTION |
| EXPOSURE CORRECTION FUNCTION | USER IS MORE LIKELY TO WANT TO KNOW THAT EXPOSURE CAN BE ADJUSTED BY EXPOSURE CORRECTION FUNCTION WHILE CHECKING HIGHLIGHT-DETAIL LOSS BY ZEBRA FUNCTION |
| ZEBRA FUNCTION | USER IS MORE LIKELY TO WANT TO KNOW ZEBRA FUNCTION |
| EXPOSURE CORRECTION FUNCTION | USER IS MORE LIKELY TO WANT TO KNOW THAT HIGHLIGHT-DETAIL LOSS CAN BE SUPPRESSED BY ADJUSTING EXPOSURE IN HIGH ISO SENSITIVITY |
| ZEBRA FUNCTION | USER IS MORE LIKELY TO WANT TO KNOW THAT ZEBRA FUNCTION CAN BE ASSIGNED TO CUSTOMIZING FUNCTION |
| EXPOSURE CORRECTION FUNCTION | USER IS MORE LIKELY TO WANT TO KNOW THAT EXPOSURE CAN BE ADJUSTED BY EXPOSURE CORRECTION FUNCTION WHILE CHECKING HIGHLIGHT-DETAIL LOSS BY ZEBRA FUNCTION |
| ZEBRA FUNCTION | USER IS MORE LIKELY TO WANT TO KNOW ZEBRA FUNCTION |
| ZEBRA FUNCTION | USER IS MORE LIKELY TO WANT TO KNOW THAT ZEBRA FUNCTION CAN BE ASSIGNED TO CUSTOMIZING FUNCTION |
| ZEBRA FUNCTION | USER IS MORE LIKELY TO WANT TO KNOW THAT EXPOSURE CAN BE ADJUSTED BY EXPOSURE CORRECTION FUNCTION WHILE CHECKING HIGHLIGHT-DETAIL LOSS BY ZEBRA FUNCTION |
| ZEBRA FUNCTION | USER IS MORE LIKELY TO WANT TO KNOW ZEBRA FUNCTION |

FIG. 11B

| INPUT DATA | | | | SUPERVISORY DATA | |
|---|---|---|---|---|---|
| NUMBER OF TIMES OF SHOOTING OF OBJECT IMAGES WHOSE STILL STATE AND MOVING STATE ARE SWITCHED | NUMBER OF TIMES OF SHOOTING OF BACK LIGHT IMAGES IN WHICH FACE IS DARK AND BACKGROUND IS BRIGHT | NUMBER OF TIMES OF AF MODE SWITCHING SETTINGS | NUMBER OF TIMES OF AUTO LIGHTING OPTIMIZER SETTINGS | NUMBER OF TIMES OF CUSTOMIZING FUNCTION SETTINGS | CUSTOMIZING FUNCTION | CORRELATION OF SUPERVISORY DATA TO INPUT DATA |
| 1 | 0 | 0 | 0 | 0 | AF MODE SWITCHING | USER IS MORE LIKELY TO WANT TO SWITCH BETWEEN ONE SHOT AF AND SERVO AF IMMEDIATELY |
| 0 | 1 | 0 | 0 | 0 | AUTO LIGHTING OPTIMIZER | USER IS MORE LIKELY TO HAVE ISSUES OF BACK LIGHT IMAGES |
| 0 | 0 | 1 | 0 | 0 | AF MODE SWITCHING | USER IS MORE LIKELY TO KNOW THAT AF MODE SWITCHING CAN BE ASSIGNED TO CUSTOMIZING FUNCTION |
| 0 | 0 | 0 | 1 | 0 | AUTO LIGHTING OPTIMIZER | USER IS MORE LIKELY TO KNOW THAT CHANGE OF FUNCTION OF AUTO LIGHTING OPTIMIZER CAN BE ASSIGNED TO CUSTOMIZING FUNCTION |

IMAGE CAPTURE APPARATUS, INFORMATION PROCESSING APPARATUS AND CONTROL METHOD

BACKGROUND

Field of the Invention

The present invention relates to a technique for setting a customizing function for assigning a predetermined shooting function to a predetermined operation member.

Description of the Related Art

In an image capture apparatus such as a digital camera, a customizing function has been known as a function in which a user can execute a desired function by assigning a desired function to an operation member, and thereby the user can execute a desired function by merely operating the operation member to which a certain function is assigned. By using the customizing function, the user can immediately change shooting settings by simply operating the operation member to which the desired function is assigned without changing the settings on a menu screen.

Japanese Patent Laid-Open No. 2004-53722 discloses a method in which a function can be assigned to a plurality of release buttons, and the setting is changed according to the operated release button to perform shooting. As a result, the user can immediately change the settings and shoot the image without changing the settings on the menu screen.

However, in Japanese Patent Laid-Open No. 2004-53722, since it is merely possible to assign different functions to the plurality of release buttons, it is necessary that the user is familiar with what function is useful to assign.

In view of this, it is conceivable to recommend a function to assign to the operation member to the user. However, when it is merely recommended to assign the function to the operation member based on the number of times of changes in the settings on the menu screen, the user does not know which function should be set when the user does not know a content of a function, and it is difficult to perform appropriate settings.

SUMMARY

The present invention has been made in consideration of the aforementioned problems, and realizes techniques that allow a user who does not know a content of a function to assign an appropriate function to an appropriate operation member.

In order to solve the aforementioned problems, the present invention provides an image capture apparatus having a customizing function of assigning a predetermined shooting function to a predetermined operation member, comprising a memory and at least one processor which function as: an acquisition unit configured to acquire shot image information obtained by a shooting operation of a user; and an estimation unit configured to estimate an operation member suitable for a customizing function to be recommended to a user as a result of executing an estimation processing based on the shot image information.

In order to solve the aforementioned problems, the present invention provides an information processing apparatus comprising a memory and at least one processor which function as: an acquisition unit configured to acquire shot image information from an image capture apparatus having a customizing function for assigning a predetermined shooting function to a predetermined operation member; and an estimation unit configured to estimate the customizing function to be recommended to a user based on the shot image information acquired from the image capture apparatus.

In order to solve the aforementioned problems, the present invention provides a method of controlling an image capture apparatus having a customizing function for assigning a predetermined shooting function to a predetermined operation member, the method comprising: acquiring shot image information obtained by a shooting operation of a user; and estimating an operation member that is suitable for a customizing function to be recommended to a user as a result of executing estimation processing based on the shot image information.

In order to solve the aforementioned problems, the present invention provides a method of controlling an information processing apparatus, the method comprising: acquiring shot image information from an image capture apparatus having a customizing function for assigning a predetermined shooting function to a predetermined operation member, and estimating a customizing function to be recommended to a user based on the shot image information acquired from the image capture apparatus.

In order to solve the aforementioned problems, the present invention provides a non-transitory computer-readable storage medium storing a program for causing a computer to execute a method of controlling an image capture apparatus having a customizing function for assigning a predetermined shooting function to a predetermined operation member, the method comprising: acquiring shot image information obtained by a shooting operation of a user; and estimating an operation member that is suitable for a customizing function to be recommended to a user as a result of executing estimation processing based on the shot image information.

In order to solve the aforementioned problems, the present invention provides a non-transitory computer-readable storage medium storing a program for causing a computer to execute a method of controlling an information processing apparatus, the method comprising: acquiring shot image information from an image capture apparatus having a customizing function for assigning a predetermined shooting function to a predetermined operation member; and estimating a customizing function to be recommended to a user based on the shot image information acquired from the image capture apparatus.

According to the present invention, even if the user who does not know the content of the function can assign an appropriate function to an appropriate member, and can shoot better still image or moving image.

Further features of the present invention will become apparent from the following description of exemplary embodiments (with reference to the attached drawings).

BRIEF DESCRIPTION OF THE DRAWINGS

FIGS. 3A and 3B are block diagrams illustrating an internal configuration of the image capture apparatus according to one or more aspects of the present disclosure.

FIG. 5 is a conceptual diagram illustrating input/output data for a learning model according to one or more aspects of the present disclosure.

FIG. 6 is a conceptual diagram illustrating a processing procedure of a system using a learning model according to one or more aspects of the present disclosure.

FIGS. 11A-1 and 11A-2 are diagrams illustrating a data table indicating a combination of input data and supervisory data used in learning processing.

FIG. 11B is a diagram illustrating a learning data table indicating a combination of input data and supervisory data used in learning processing.

DESCRIPTION OF THE EMBODIMENTS

Figure 1:
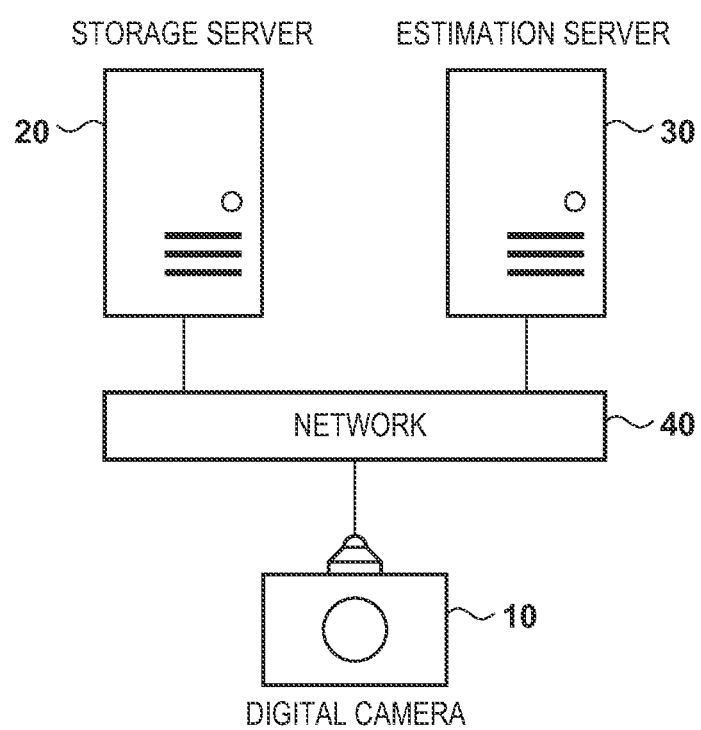
FIG. 1 is a diagram illustrating a system configuration including an image capture apparatus according to one or more aspects of the present disclosure.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Hereinafter, embodiment in which the image capture apparatus of the present invention is applied to a single-lens reflex digital camera capable of capturing a still image and/or a moving image and the information processing apparatus of the present invention is applied to a server computer will be described in detail with reference to the accompanying drawings.

<System Configuration>

First, a system configuration of the present embodiment will be described with reference to FIG. 1.

The system of the present embodiment includes a digital camera 10, a storage server 20 and an estimation server 30. The digital camera 10 transmits operation history information to the storage server 20 via the network 40. The storage server 20 stores the operation history information received from the digital camera 10, and requests the estimation server 30 which has higher processing performance than the digital camera 10, to execute estimation processing. In addition to shot image information accumulated in the storage server 20, the estimation server 30 generates a learned model for outputting a customizing function to be recommended to a user with respect to the operation history information by using operation history information including shooting setting information as input data and using the customizing function that will be described later with reference to FIGS. 11A-I, 11A-2 and 11B as supervisory data. The shot image information includes information such as presence/absence of a highlight-detail loss in a shot image, presence/absence of a backlight image with a dark face and a bright background, and presence/absence of an object image whose still state and moving state are switched such as a bird or a child. The operation history information also includes information including shooting setting information such as an ISO sensitivity setting, an exposure correction function setting, a zebra function setting, an AF (automatic focus) mode switching setting, an auto lighting optimizer setting, and a customizing function setting.

The estimation server 30 links a plurality of input data and supervisory data, and generates the learned model by executing learning processing using a neural network. The learned model may be generated before the system runs, or may be generated again at a predetermined timing while the system runs. This makes it possible to re-generate the learned model while the system runs, thereby enabling highly accurate estimation.

Further, in the present embodiment, the storage server 20 stores the operation history information and the estimation server 30 executes the learning processing, however, the functions of the servers may be replaced or executed in the same apparatus. In addition, the present embodiment is limited to the server, and may be applied to a user terminal such as a smartphone.

<Configuration of Image Capture Apparatus>

Figure 2A:
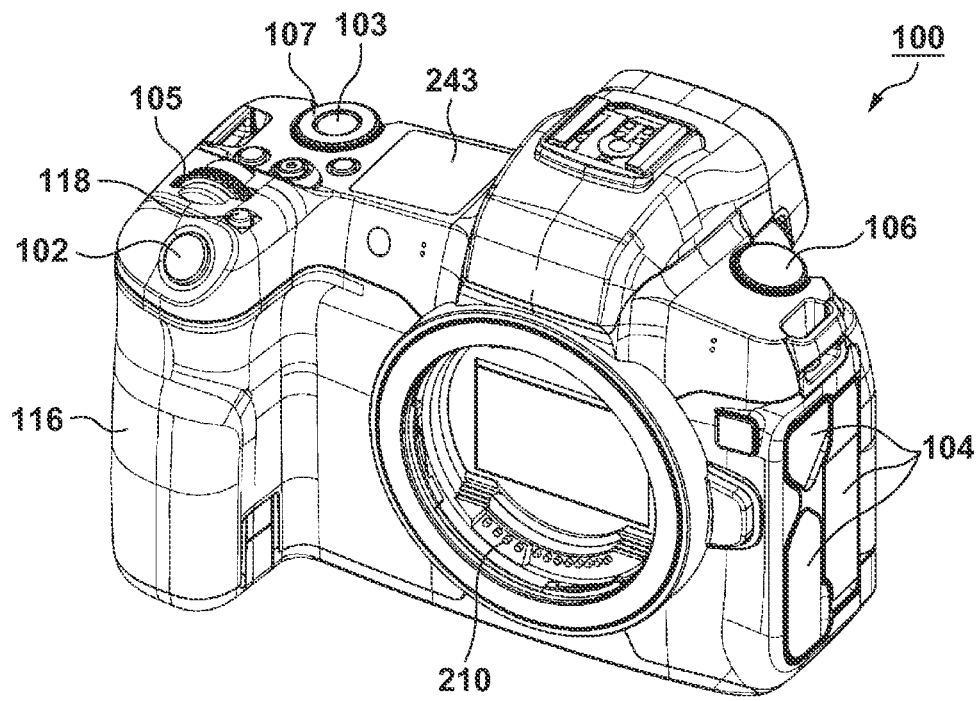
FIGS. 2A and 2B are external views of the image capture apparatus according to one or more aspects of the present disclosure.
Figure 2B:
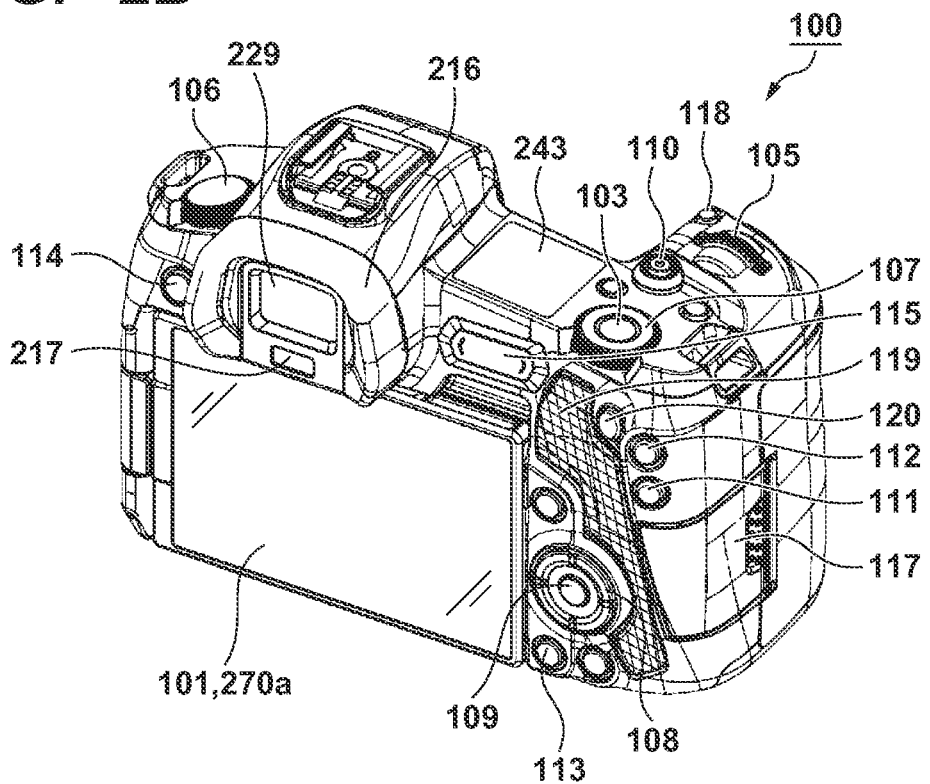

With reference to FIGS. 2A, 2B and 3, the configuration and functions of the digital camera 10 according to the present embodiment will be described.

FIG. 2A is a front perspective view of the digital camera 10 in a state where a lens unit 200 is detached. FIG. 2B is a back perspective view of the digital camera 10.

In FIGS. 2A and 2B, a backside display unit 101 is an out-of-finder display unit for displaying images and various types of information and a display device such as an LCD provided on the back surface of the camera body. Moreover, the backside display unit 101 has a function of reproducing a still image after the still image was shot, a function of displaying a moving image that is being recorded, and a live view display (through-the-lens display) function as well. A touch panel (touch screen) 270a is provided on the backside display unit 101. The touch panel 270a is a touch operation member capable of detecting contact (touch operation) with the display surface (touch operation surface of the touch panel 270a) of the backside display unit 101.

An out-of-finder display unit 243 is a display device provided on the upper surface of the camera body, and displays various setting values of the camera such as a shutter speed and a diaphragm aperture. A shutter-release button 102 is an operation member for giving a shooting instruction. A mode selection switch 103 is a rotating dial type operation member for switching between various modes. A terminal cover 104 is a cover member for protecting a connector (not illustrated) for connecting an external device and the digital camera 10 via a cable such as a USB cable. A main electronic dial 105 is a rotating operation member included in operation units 270 that will be described later with reference to FIG. 3A, and by rotating this main electronic dial 105, setting values such as a shutter speed and a diaphragm aperture can be changed.

A power supply switch 106 is an operation member for switching between on/off of the power supply to the digital camera 10. A sub electronic dial 107 is a rotating operation member included in the operation units 270 that will be described later with reference to FIG. 2, and can move a selected frame, scroll images, and/or the like. A cross key 108 is also a movement instruction member included in the operation units 270 that will be described later with reference to FIG. 3A, and is a four-directional operation button having push buttons that can be pressed in four directions of up, down, left, and right. The operation can be performed according to the portion of the cross key 108 pressed in the pressed direction. A SET button 109 is also a push button included in the operation units 270 that will be described later with reference to FIG. 3A, and is mainly used for determining a selection item and/or the like.

A video recording button 110 is also included in operation units 270 that will be described later with reference to FIG. 3A, and is used to instruct start and stop of moving image shooting (recording). An AE lock button 112 is also included in the operation units 270 that will be described later in FIG. 3A, and can fix an exposure state by being pressed in a shooting standby state. An enlargement/reduction button 111 is also included in the operation units 270 that will be described later in FIG. 3A, and is an operation button for turning on/off of an enlargement mode during a live view display in the shooting mode. By operating the main electronic dial 105 after turning on of the enlargement mode, the live view image can be enlarged or reduced. In the reproduction mode, the main electronic dial 105 functions as an enlargement button for enlarging a reproduced image and increasing an enlargement ratio.

A reproduction button 113 is also an operation button included in the operation units 270 that will be described later in FIG. 3A, and is an operation button for switching the operation mode of the digital camera 10 to the shooting mode or the reproduction mode. By pressing the reproduction button 113 during the shooting mode, the operation mode is switched to the reproduction mode, and the latest image among the images recorded on the recording medium 250 can be displayed on the backside display unit 101. A menu button 114 is also included in the operation units 270 that will be described later in FIG. 3A, and a menu screen on which various settings can be made can be displayed on the backside display unit 101 when pressed. The user can intuitively perform various settings using the menu screen displayed on the backside display unit 101, the cross key 108 and the SET button 109 or the multi-controller 115.

A touch bar 115 (multi-function bar) is also included in the operation units 270 that will be described later in FIG. 3A, and is a line-shaped touch operation member (line touch sensor) capable of accepting a touch operation. The touch bar 115 is arranged at a position that can be touched (touchable) by the thumb of the right hand while gripping a grip portion 116 with the right hand so that the shutter-release button 102 can be pressed with the index finger of the right hand (a state of gripping the grip portion with the little finger, the ring finger and the middle finger of the right hand). That is, the touch bar 115 is arranged at a position in which the user can operate the touch bar 115 in a state (shooting posture) where the user is looking through the viewfinder by contacting the eye with the eyepiece part 216 and can press the shutter-release button 102 at any time. The touch bar 115 is an acceptance unit capable of accepting a tap operation (an operation of touching and releasing the touch bar 115 without moving a touch position within a predetermined time period), a slide operation to the left and right (an operation of touching the touch bar 115 and moving a touch position while touching the touch bar 115), or the like. The touch bar 115 is an operation member which is different from the touch panel 270a and does not have a display function.

A multi-function button 118 is also included in the operation units 270 that will be described later in FIG. 3A, and is arranged at a position where the user can operate the multi-function button 118 with the index finger while gripping the grip portion 116 with the right hand. That is, the multi-function button 118 is arranged at a position where the user can operate the multi-function button 118 while looking through the viewfinder by contacting the eye with the eyepiece part 216.

A grip portion 116 has a shape that makes it easy to be gripped by a user's a right hand when he or she holds the digital camera 10. The shutter-release button 102 and the main electronic dial 105 are arranged at positions where the user can operate the shutter-release button 102 and the main electronic dial 105 with the index finger of the right hand while holding the digital camera 10 by gripping the grip portion 116 with the little finger, the ring finger and the middle finger of the right hand. In the same state, the sub electronic dial 107 is arranged at a position operable with the thumb of the right hand. A lid 117 is a member for opening or closing a slot for mounting/removing the recording medium 250 to/from the digital camera 10.

A communication terminal 210 is an electric contact point for the digital camera 10 to perform communication with the lens unit 200. An eyepiece part 216 is a look-through type eyepiece finder. The user can visually recognize an image displayed on an electronic viewfinder (EVF) which is the in-finder display unit 229 through the eyepiece part 216, and can confirm the focus and composition of the captured object image through the lens unit 200 that will be described later in FIG. 3A.

An eye approach detection unit 217 is arranged near the eyepiece part 216, and can detect approach of any object to the eyepiece part 216. As the eye approach detection unit 217, for example, an infrared proximity sensor is used.

A thumb rest portion 119 (thumb waiting position) is a grip member on the back side of the digital camera 10, which is provided at a position where the thumb of the right hand that grips the grip portion 116 is easily placed in a state in which the user does not operate any operation member. The thumb rest portion 119 is comprised of a rubber member or the like for increasing a force for holding the digital camera 10 (grip feeling).

An AF frame selection button 120 is included in the operation units 270 that will be described later in FIG. 3A, the user can select the AF position (frame) to be focused by operating the cross-key 108 or the like.

Next, with reference to FIG. 3A, the internal configuration of the digital camera 10 and the lens unit 200 of the present embodiment will be described. In FIG. 3A, components that are the same as those in FIGS. 2A and 2B are denoted by the same reference numerals.

In FIG. 3A, the lens unit 200 is equipped with a shooting lens 207, and is detachable from the digital camera 10. The shooting lens 207 is usually constituted by a plurality of lenses, but is simplified here and is shown by one lens. A communication terminal 206 is an electric contact point for the lens unit 200 to perform communication with the digital camera 10. The communication terminal 210 is an electric contact point for the digital camera 10 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. An A/D converter 223 converts an analog signal output from the image capturing unit 222 into a digital signal.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

The memory control unit 215 controls the exchange of data among the A/D converter 223, the image processing unit 224, and the memory 232. Digital data output from the A/D converter 223 is directly written into the memory 232 via both the image processing unit 224 and the memory control unit 215 or via the memory control unit 215. The memory 232 stores image data obtained from the image capturing unit 222 and the A/D converter 223, and display data for displaying the image on the backside display unit 101 or the in-finder display unit 229. The memory 232 has a storage capacity that is sufficient for storing a predetermined number of still images as well as moving images and audio of a predetermined time period. The memory 232 also functions as a memory for image display (video memory).

A D/A converter 219 converts the display data for the image stored in the memory 232 into an analog signal and supplies the backside display unit 101 or the in-finder display unit 229 with the analog signal. The display data for the image that was written into the memory 232 is displayed by the backside display unit 101 or the in-finder display unit 229 via the D/A converter 219. The backside display unit 101 and the in-finder display unit 229 display on the display device in accordance with the analog signal from the D/A converter 219. In this manner, the digital signals stored in the memory 232 are converted into analog signals, and the analog signals are successively transmitted to the backside display unit 101 or the in-finer display unit 229 so as to be displayed thereon, making it possible to function as an electronic view finder (EVF) and to perform live view (LV) display (through-the lens image display).

Various information of the camera such as a shutter speed and a diaphragm aperture at the time of shooting are displayed on the out-of-finder display unit 243 via an out-of-finder display unit driving circuit 244.

A nonvolatile memory 256 is an electrically erasable/recordable memory, and for example, a flash ROM or the like is used. In the nonvolatile memory 256, constants and programs, for example, for operating the system control unit 201 are stored. In this context, "programs" may refer to programs for executing flowcharts that will be described later.

The system control unit 201 is an arithmetic processing device comprising at least one processor, overall controlling the entire digital camera 10. The system control unit 201 realizes, by executing the programs stored in the nonvolatile memory 256, the procedures of the flowchart that will be described later. As the system memory 252, for example, RAM is used, the system memory 252 is used also as a work memory where constants and variables for operating the system control unit 201, and the programs read out from the nonvolatile memory 256 are expanded. The system control unit 201 controls the memory 232, the D/A converter 219, the backside display unit 101, the in-finder display unit 229, and/or the like, so as to perform display control. A system timer 253 is a time measurement unit for measuring time periods for various types of controls and the time of an inner clock.

The mode selection switch 103, a first shutter switch 211, a second shutter switch 212, and the operation units 270 are operation devices for inputting various types of operating instructions to the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority mode (Av mode), shutter-priority AE mode (Tv mode), and program AE mode (P mode), for example. The still image shooting mode also includes various scene modes each for which scene-specific shooting setting is made, custom mode, and/or the like.

The user may directly switch to any of these shooting modes by operating the mode selection switch 103, or may switch to any of the shooting modes using another operation member after once being switched to a list screen of the operation modes with the mode selection switch 103 and selecting any of the plurality of shooting modes displayed in a list. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 starts shooting preparation operations such as AF (auto focus) processing, AE (auto exposure) processing, AWB (auto white balance) processing, and EF (flash pre-emission) processing.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of the captured image data as an image file to the recording medium 250.

The operation units 270 comprise operation members such as various switches and buttons for accepting various operations from a user, and notifying the system control unit 201 of the accepted operations, and include at least the following operation members: the shutter-release button 102, the mode selection switch 103, the main electronic dial 105, the power supply switch 106, the sub electronic dial 107, the cross key 108, the SET button 109, the video recording button 110, the enlargement/reduction button 111, the AE lock button 112, the reproduction button 113, the menu button 114, the touch bar 115, the multi-function button 118 and the AF frame selection button 120.

A power control unit 280 is constituted by, for example, a battery detection circuit, a DC-DC converter, and a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each component including the recording medium 250.

A power supply unit 230 comprises a primary battery such as an alkaline battery or a lithium battery, and a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and is constituted by a semiconductor memory, a magnetic disk, or the like.

A communication unit 254 communicably connects an external device by a wireless antenna or a cable, and transmits and receives a video signal, an audio signal, and/or the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection device such as a USB cable, HDMI®, IEEE 1394, or the like.

An attitude detection unit 255 detects the attitude (orientation) of the digital camera 100 with respect to the gravity direction. Based on the attitude detected by the attitude detection unit 255, it is possible to discriminate whether an image captured by the image capturing unit 222 has been shot by setting the digital camera 100 in the landscape or portrait direction. The system control unit 201 can add orientation information corresponding to the attitude detected by the attitude detection unit 255 to the image file, and rotate and record the captured image. An acceleration sensor, gyro sensor or the like may be used as the attitude detection unit 255. The attitude detection unit 255 can also detect the movement (pan, tilt, lift, rest, etc.) of the digital camera 100 by using the acceleration sensor or the gyro sensor.

Included among the operation units 270 is also the touch panel 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated. As a result, a GUI can be constructed so as to make it possible for the user to directly manipulate the screen displayed on the backside display unit 101. The system control unit 201 is capable of detecting the following touch operations and/or conditions performed by contacting the touch panel 270a.

Newly touching of the touch panel 270a by a finger or pen which has not been in contact with the touch panel 270a, that is, a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Releasing a finger or pen that has been in contact with the touch panel 270a, that is, an end of the touch (referred to as "touch-up" below).

A state in which the touch panel 270a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a.

As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The eye approach detection unit 217 detects whether an eye (an object) has approached (eye approaching) or has moved away (eye separation) from the eyepiece part 216 (approach detection). The system control unit 201 switches the backside display unit 101 and the in-finder display unit 229 between displaying (a display state)/not displaying (a non-display state) in accordance with the state detected by the eye approach detection unit 217. The system control unit 201 sets a display destination as the backside display unit 101 and sets the in-finder display unit 229 to be not displaying during non-eye approach detection at least in a case where the shooting mode and the switching of the display destination are automatic. Further, the system control unit 201 sets the display destination as the in-finder display unit 229 and sets the backside display unit 101 to be not displaying during eye approach detection.

If an object has approached, infrared light irradiated from a light emitting unit (not illustrated) of the eye approach detection unit 217 is reflected and is made to be incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the in-finder display unit 229 to start. With this, it is possible for the in-finder display unit 229 to display without delay as much as possible when a user looks through the eyepiece part 216.

In addition, upon detecting that an object has approached within a predetermined distance with respect to the eyepiece part 216 from a non-eye approaching state (no approach state), the eye approach detection unit 217 determines that eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is a non-eye approaching state until eye approaching is detected. With this, the system control unit 201 performs display control of the backside display unit 101 and the in-finder display unit 229 in response to an eye approaching state or an eye separation state detected by the eye approach detection unit 217.

Note that the eye approach detection unit 217 is not limited to an infrared proximity sensor, and another sensor may be used if it can detect an approach of an object or an eye to be deemed as an eye approaching.

<Configuration of Information Processing Apparatus>

Next, the configuration and functions of the information processing apparatus 300 according to the present embodiment will be described with reference to FIGS. 3A, 3B and 4.

The information processing apparatus 300 of the present embodiment is a hardware that constitutes a storage server 20 and an estimation server 30. Note that each of the storage server 20 and the estimation server 30 may be implemented by a single information processing apparatus, or each function of the storage server 20 and the estimation server 30 may be distributed and implemented in a plurality of information processing apparatuses as necessary. When the storage server 20 and the estimation server 30 are configured by a plurality of information processing apparatuses, they are connected to estimate other so as to be able to communicate with each other.

Figure 3B:
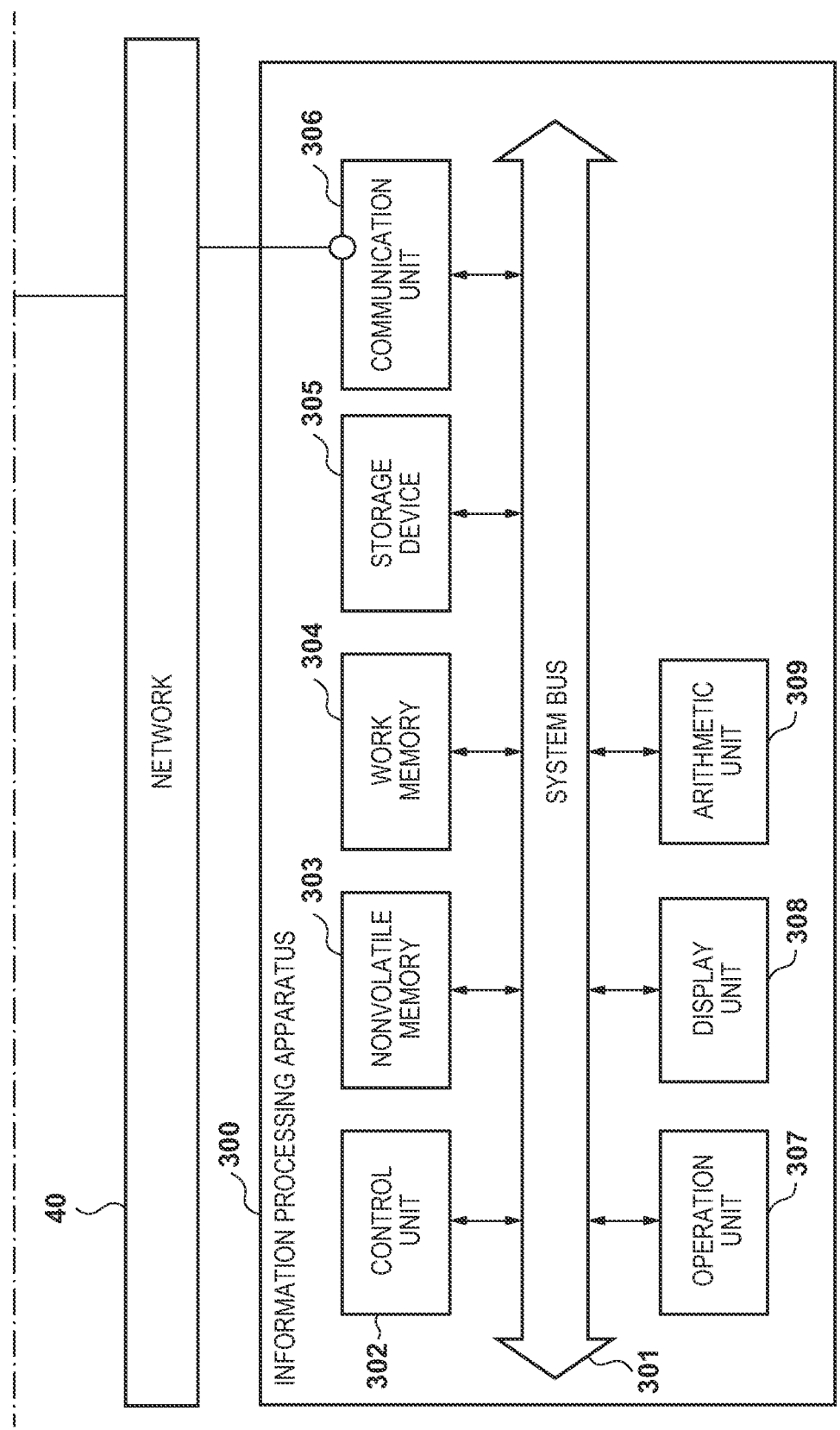

In FIG. 3B, a system bus 301 connects the respective components 302 to 309 so as to be able to perform data communication with each other. A control unit 302 is an arithmetic processing unit such as a CPU or an MPU that controls the entire information processing apparatus 300. A nonvolatile memory 303 is a ROM for storing programs and parameters. A work memory 304 is a RAM for temporarily storing programs and data supplied from an external storage device or a network 40. A storage device 305 is an auxiliary storage device such as a hard disk or a memory card incorporated in the information processing apparatus 300, or an external storage device such as an optical disk, a magnetic card, an optical card, or an IC card detachable from the information processing apparatus 300. A communication unit 306 is a network interface for connecting to a line such as a network 40. An operation unit 307 is an interface with an input device such as a pointing device or a keyboard that accepts an operation of the user and inputs various types of data. A display unit 308 is an interface with a display device such as a display for displaying data held by the information processing apparatus 300 and/or data supplied from an external device. An arithmetic unit 309 is a GPU or the like capable of executing an efficient arithmetic operation by processing more data in parallel. In a case where the learning is executed the number of times using a learning model such as a deep learning, it is effective to execute processing in the arithmetic unit 309.

The processing of the information processing apparatus 300, which will be described later, is realized by the control unit 302 reading and executing a program acquired from the storage device 305 or the network 40 and controlling various devices.

Figure 4:
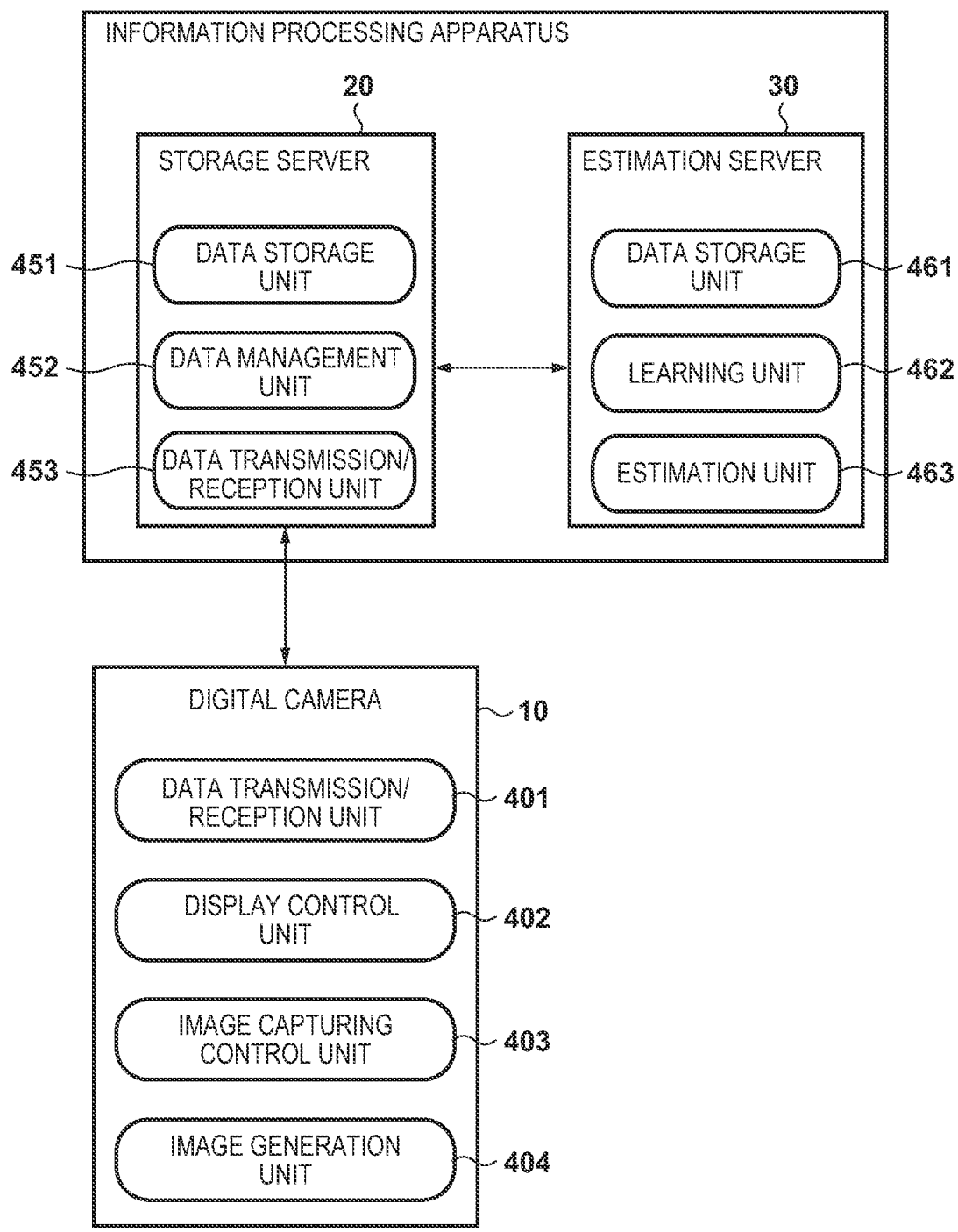
FIG. 4 is a diagram illustrating a software configuration of the image capture apparatus according to one or more aspects of the present disclosure.

FIG. 4 is a diagram illustrating a software configuration realized by hardware resources shown in FIGS. 3A and 3B and programs.

The digital camera 10 includes a data transmission/reception unit 401, a UI display control unit 402, an image capturing control unit 403, and an image generation unit 404. The data transmission/reception unit 401 transmits operation history information including shot image information of an image shot by the digital camera 10 and shoot setting information at the time of shooting to the information processing apparatus 300, and receives a customizing function (recommended customizing function) recommended to the user as an estimation result from the information processing apparatus 300. The UI display control unit 402 displays an image shot by the digital camera 10, a screen for setting a customizing function, and the like. The image capturing control unit 403 executes the shooting processing of the digital camera 10. The image generation unit 404 executes various types of image processing and the like on the image data on which the image capturing processing has been executed by the image capturing control unit 403, and generates an image file.

The storage server 20 includes a data storage unit 451, a data management unit 452, and a data transmission/reception unit 453. The data storage unit 451 stores the operation history information received from the digital camera 10 in the nonvolatile memory 303. The data management unit 452 manages the registration and deletion of the operation history information. The data transmission/reception unit 453 receives the operation history information from the digital camera 10 and transmits the estimation result of the customizing function to the digital camera 10.

The estimation server 30 includes a data storage unit 461, a learning unit 462, and an estimation unit 463. The data storage unit 461 stores the result of the learning processing in the learning unit 462 and the result of the estimation processing in the estimation unit 463 in the nonvolatile memory 303. The learning unit 462 executes a learning program for causing the neural network used for the estimation processing of the recommended customizing function to learn the supervisory data. The estimation unit 463 executes estimation processing of the recommended customizing function using the learned model. When the learning unit 462 executes the learning program including the learning model, the learning unit 462 executes learning processing by causing the control unit 302 and the arithmetic unit 309 to execute arithmetic processing in cooperation with each other. The processing of the learning unit 462 may be executed by either the control unit 302 or the arithmetic unit 309. The processing of the estimation unit 463 may also be executed by either the control unit 302 or the arithmetic unit 309.

The learning unit 462 may include an error detection unit and an update unit. The error detection unit obtains an error between the output data output from the output layer of the neural network and the supervisory data according to the input data input to the input layer. The error detection unit may calculate the error between the output data from the neural network and the supervisory data using the loss function. Based on the error obtained by the error detection unit, the update unit updates the combine-weighting coefficient and the like between nodes of each neural network so that the error is reduced. The updating unit updates the combine-weighting coefficient and the like using, for example, the error backpropagation method. The error backpropagation method is a technique to adjust the combine-weighting coefficient and the like between nodes of each neural network so that the above errors become small.

FIGS. 11A-1, 11A-2 and 11B are data tables illustrating a combination of input data and supervisory data used in the learning processing.

FIGS. 11A-1 and 11A-2 exemplify, as the input data, the number of times the images with the highlight-detail loss have been shot, the number of times the ISO sensitivity settings have been changed to the higher ISO sensitivity, the number of times the zebra function settings have been changed, the number of times the exposure correction function settings have been changed, and the number of times the customizing function settings have been changed. FIGS. 11A-1 and 11A-2 show a correlation between an optimal customizing function when each data has been input and the supervisory data with respect to the input data as a recommended basis.

In FIGS. 11A-1 and 11A-2, it is determined that the user does not know a zebra function and it is recommended that the zebra function should be assigned to the operation member if the number of times the images with the highlight-detail loss have been shot by the user is one and the number of times the zebra function which is a function capable of preventing the highlight-detail loss by superimposing a stripe pattern corresponding to a luminance on a natural image, have been changed is zero, as the input data.

If the number of times of changes in the zebra function settings under the above conditions is changed from 0 to 1, and the number of times of changes in the customizing function setting is 0, it is determined that the user knows the zebra function, but the user does not know that the function assigned to the operation member can be customized to the zebra function, and it is recommended that the zebra function should be assigned to the operation member.

Further, if the number of times of changes in the customizing function setting under the above condition is changed from 0 to 1, it is determined that the user knows the zebra function and knows that the user can immediately switched to the zebra function by the operation member, but the user does not know how to change the exposure and therefore the images with the highlight-detail loss have been shot, the exposure correction function setting in which the exposure can be adjusted is recommended.

FIG. 11B exemplifies, as the input data, the number of times the object images whose still state and moving state are switched have been shot, the number of times the backlight image in which the face is dark and the background is bright have been shot, the number of times the AF mode switching settings have been changed, the number of times the auto lighting optimizer has been set, and the number of times the customizing function has been set, and shows the optimal customizing function when each data is input and the correlation of the supervisory data with respect to the input data as a recommendation basis.

In FIG. 11B, the AF mode switching function capable of quickly switching between one-shot AF suitable for still state and servo AF suitable for moving state when the object in the shot image is a person or a face of a person or animal (e.g., birds or children) is recommended. Further, the setting of the auto lighting optimizer in which the image processing is executed so that the face becomes an appropriate brightness is recommended for the user who is shooting the backlight image.

FIG. 5 shows input/output data for the learning model of the present embodiment.

Input data 501 is operation history information including a shot image acquired by a shooting operation of a user. Output data 502 is a score indicating an optimal customizing function. The score is output as a probability of the values 0 to 1, and is output as a value close to 1 if it is estimated to be the optimal customizing function for the user. In the learning method in the learning phase, for example, the combination of the customizing function for the operation history information prepared by the user with high skill is learned as the supervisory data. The learning unit 462 prepares and learns patterns for tens of thousands of people by using the arithmetic unit 309, and thereafter, for example, prepares and evaluates operation history information for testing for thousands of people, and repeats the evaluation until the correct answer rate becomes equal to or higher than a predetermined value. This also applies to the output in the estimation phase. Although the operation history information of the user is not reflected in the processing in the learning unit 462 in the present embodiment, the operation history information of the user may be reflected in the processing in the learning unit 462.

FIG. 6 shows a processing procedure of the system of the present embodiment using the learning model shown in FIG. 5.

First, the digital camera 10 transmits the operation history information of the user to the storage server 20. The storage server 20 stores the operation history information received from the digital camera 10 in the data storage unit 451 and transmits the operation history information to the estimation server 30. The estimation server 30 calculates the score of the optimal customizing function based on the operation history information using the learned model, and transmits the estimation result to the storage server 20. The storage server 20 transmits the estimation result to the digital camera 10.

By estimating the optimal customizing function in such a procedure, it is possible to calculate the score of the customizing function having a large processing load. If the processing load by the digital camera 10 will be sufficient, the estimation calculation may be executed by the digital camera 10. If the storage capacity of the digital camera 10 will be sufficient, the operation history information may be stored in the digital camera 10.

Figure 7A:
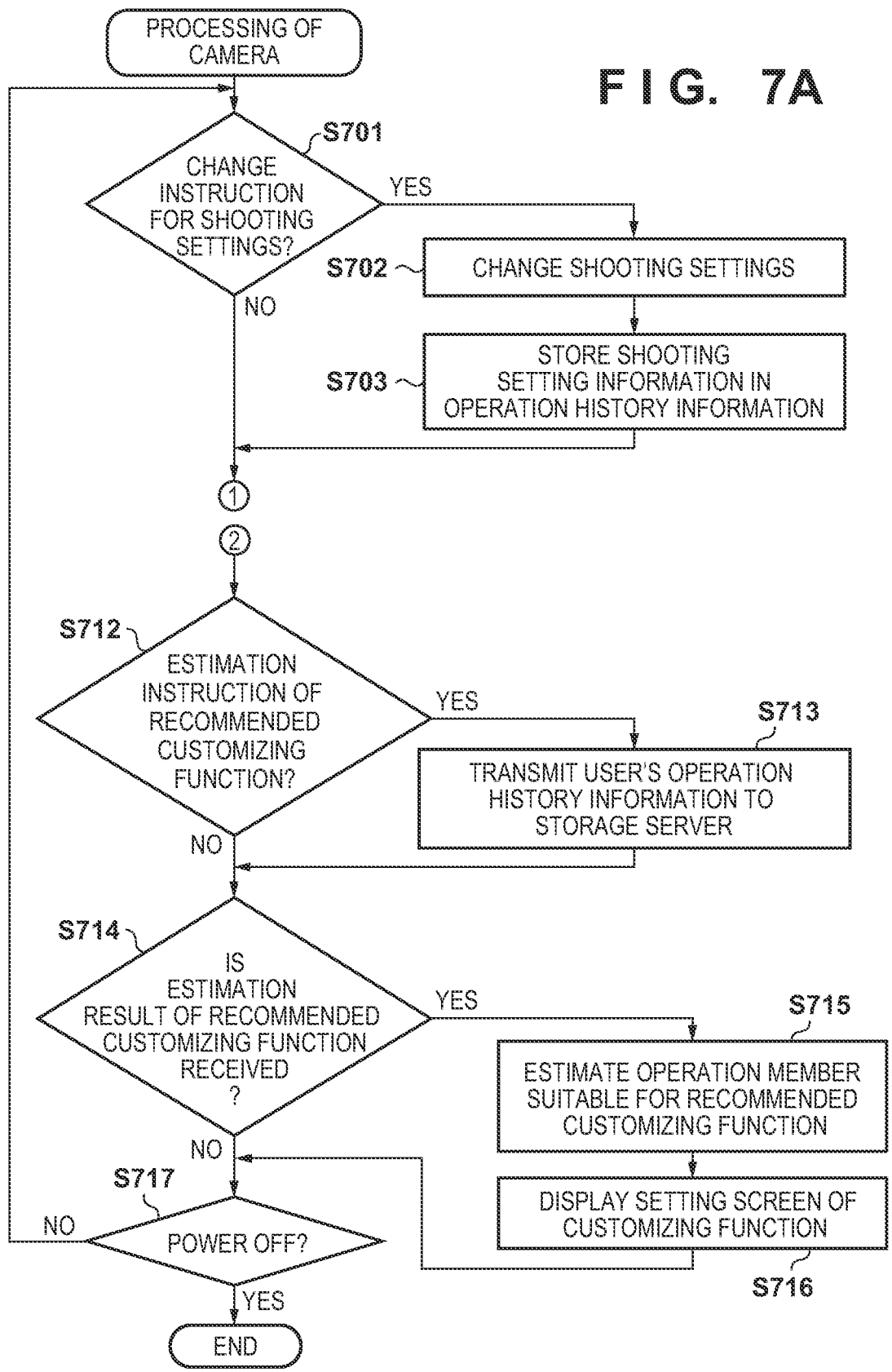
FIGS. 7A and 7B are flowcharts illustrating processing of the image capture apparatus according to one or more aspects of the present disclosure.
Figure 7B:
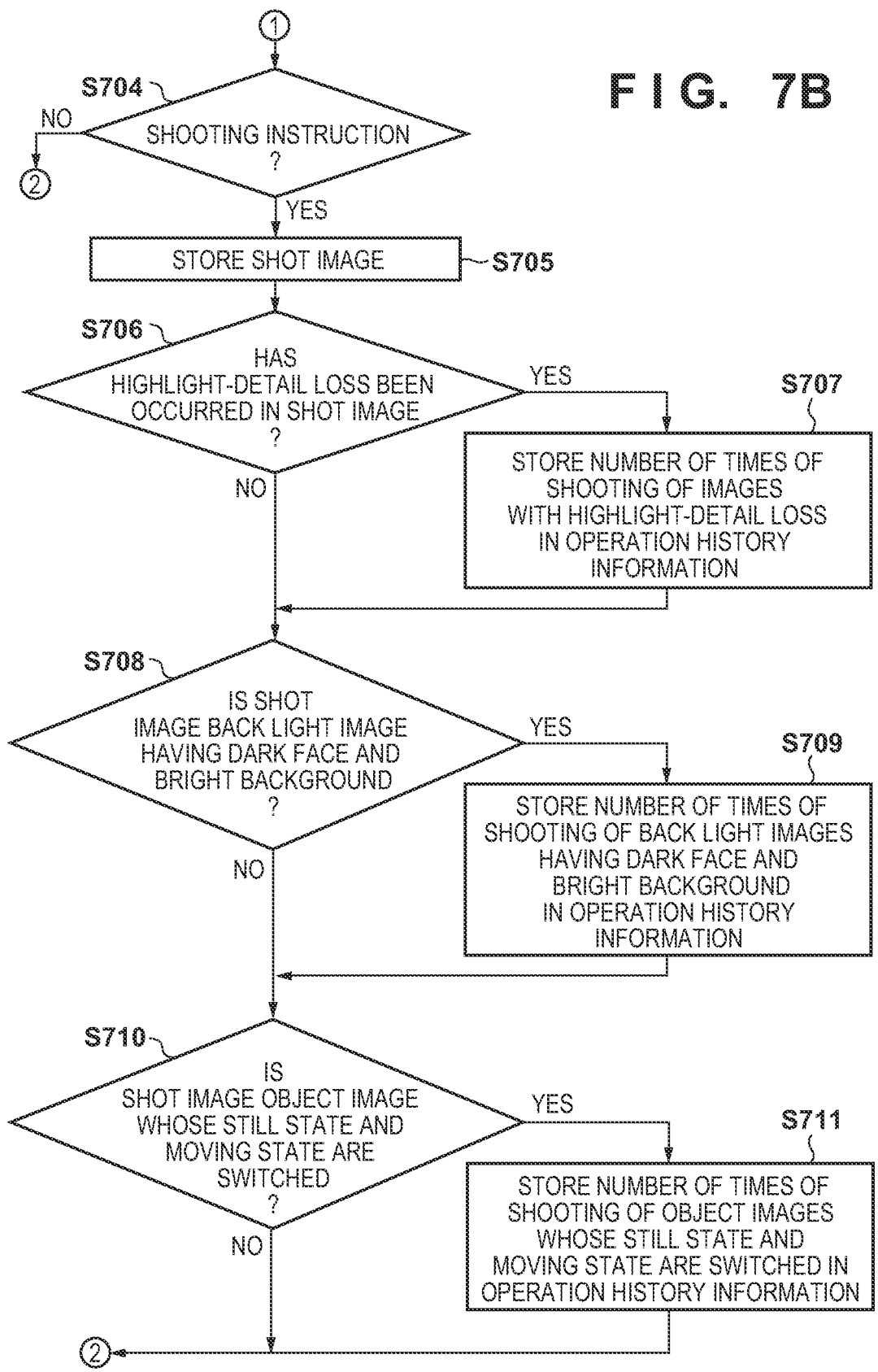

FIGS. 7A and 7B are flowcharts illustrating the processing of the digital camera 10 in the processing procedure of FIG. 6.

The processing of FIGS. 7A and 7B is realized by the system control unit 201 expanding and executing a program stored in the nonvolatile memory 256 in the system memory 252, and controlling each component of the digital camera 10.

In step S701, the system control unit 201 determines whether or not a change instruction for shooting settings has been made. When the system control unit 201 determines that the change instruction for shooting settings has been made, the processing proceeds to step S702, and when the system control unit 201 determines that the change instruction for shooting settings has not been made, the processing proceeds to step S704. Examples of shooting settings include an ISO sensitivity setting, an exposure correction function setting, a zebra function setting, an AF mode switching setting, an auto lighting optimizer setting, and a customizing function setting.

In step S702, the system control unit 201 changes shooting settings such as ISO sensitivity settings, exposure correction function settings, zebra function settings, AF mode switching settings, auto lighting optimizer settings, and customizing function settings, and stores them in the system memory 252.

In step S703, the system control unit 201 stores the shooting setting information indicating the number of times of changes in the shooting settings in the system memory 252 as the operation history information. In the present embodiment, in view of the fact that the data amount of the operation history information increases, it is configured that the operation history information is temporarily stored in the digital camera 10 and is stored in the storage server 20 for long time periods. However, when the memory capacity of the digital camera 10 is sufficiently large, the operation history information may be stored in the digital camera 10 for long time periods. Further, in the present embodiment, the number of times of changes in the shooting settings are stored as the operation history information, but instead of the number of times of changes in the settings, the using time period of the setting, the number of times the shooting has been performed using the setting, and the like may be used as the operation history information.

In step S704, the system control unit 201 determines whether or not the shutter button 102 has been pressed, that is, whether or not a shooting instruction has been made. When the system control unit 201 determines that the shutter button 102 has been pressed, the processing proceeds to step S705, when the system control unit 201 determines that the shutter button 102 has not been pressed, the processing proceeds to step S712.

In step S705, the system control unit 201 generates shot image files by the image generation unit 404 from the image data captured by the image capturing control unit 403, and stores the shot image files in the recording medium 250.

In step S706, the system control unit 201 determines whether or not the highlight-detail loss has been occurred in the shot image generated in step S705. When the system control unit 201 determines that the highlight-detail loss has been occurred in the shot image, the processing proceeds to step S707, when the system control unit 201 determines that the highlight-detail loss has not been occurred in the shot image, the processing proceeds to S708.

In step S707, the system control unit 201 stores the number of times the images with the highlight-detail loss have been shot in the system memory 252 as the operation history information. In the present embodiment, although the number of times the images with the highlight-detail loss have been shot is stored in the operation history information, such as the number of times the shot images with the highlight-detail loss have been deleted after shooting may be used as the operation history information.

In step S708, the system control unit 201 determines whether or not the shot image generated in step S705 is a backlight image having a dark face and a bright background. When the system control unit 201 determines that the shot image is the backlight image having the dark face and the bright background, the processing proceeds to step S709, when the system control unit 201 determines that the shot image is not the backlight image having the dark face and the bright background, the processing proceeds to step S710.

In step S709, the system control unit 201 stores, in the system memory 252, the number of times the backlight images with the dark face and the bright background have been shot as the operation history information. In the present embodiment, although the number of times the backlight images with the dark face and the bright background has been shot is stored in the operation history information, such as the number of times the backlight images have been deleted after shooting may be used as the operation history information.

In step S710, the system control unit 201 determines whether or not the shot image generated in step S705 is an object image whose still state and moving state are switched such as a children or a bird. When the system control unit 201 determines the shot image is the object image whose still state and moving state are switched such as a children or a bird, the processing proceeds to step S711, when the system control unit 201 determines that the shot image is not the object image whose still state and moving state are switched such as a children or a bird, the processing proceeds to step S712.

In step S711, the system control unit 201 stores, in the system memory 252, the number of times the object images whose still state and moving state are switched such as a child or a bird have been shot, as the operation history information. In the present embodiment, although the number of times the object images whose still state and moving state are switched such as a child or bird have been shot is stored in the operation history information, the number of times the object images whose still state and moving state are switched have been deleted after shooting may be used as the operation history information.

In step S712, the system control unit 201 determines whether or not an estimation instruction of the customizing function has been made by the user. When the system control unit 201 determines that the estimation instruction of the customizing function has been made, the processing proceeds to step S713, when the control unit 201 determines that the estimation instruction of the customizing function has not been made, the processing proceeds to step S714.

In step S713, the system control unit 201 transmits the operation history information to the storage server 20 by the data transmission/reception unit 401. The operation history information transmitted in this step is based on shooting settings, shooting image information, and/or the like.

In step S714, the system control unit 201 determines whether or not the recommended customizing function as the estimation result in the estimation server 30 has been received from the storage server 20 by the data transmission/reception unit 401. When the system control unit 201 determines that the recommended customizing function has been received from the storage server 20, the processing proceeds to step S715, when the system control unit 201 determines that the recommended customizing function has not been received from the storage server 20, the processing proceeds to step S717.

In step S715, the system control unit 201 estimates an operation member suitable for the recommended customizing function received in step S714. The processing of estimating the operation member suitable for the recommended customizing function may use the learned model that has been machine-learned, or may be a rule-based processing such as a look-up table (LUT). When the LUT is used, for example, the relationship between the input data and the output data may be generated in advance as the LUT, and the generated LUT may be stored in the nonvolatile memory 256 of the digital camera 10. The estimation of the operation member suitable for the recommended customizing function can be executed by acquiring the output data with reference to the LUT. In other words, the LUT can operate in cooperation with the CPU or GPU as a program for executing the processing equivalent to the estimating processing of the operation member suitable for the recommended customizing function.

For details, when the exposure correction function is received from the information processing apparatus 300 as the recommended customizing function related to the shooting function, it is likely to be used while checking the live view image by looking through the viewfinder. For this reason, the convenience for the user is improved by assigning the multi-function button 118 which is located near the viewfinder and is easy to operate even in the blind state. It is also possible to estimate so as to determine that the operation member to which the customizing function has been changed from the initial value has been intentionally changed, and preferentially assign the operation member to which the customizing function has not been changed from the initial value.

Further, the customizing function can be assigned not only to a physically operable member but also to a member capable of detecting a touch operation such as a touch panel, and further, can be assigned to each touch operation in fines such as touch-down or touch-up.

In the present embodiment, the digital camera 10 estimates the operation member suitable for the recommended customizing function, but the storage server 20 and the estimation server 30 can also estimate the operation member.

Figure 10:
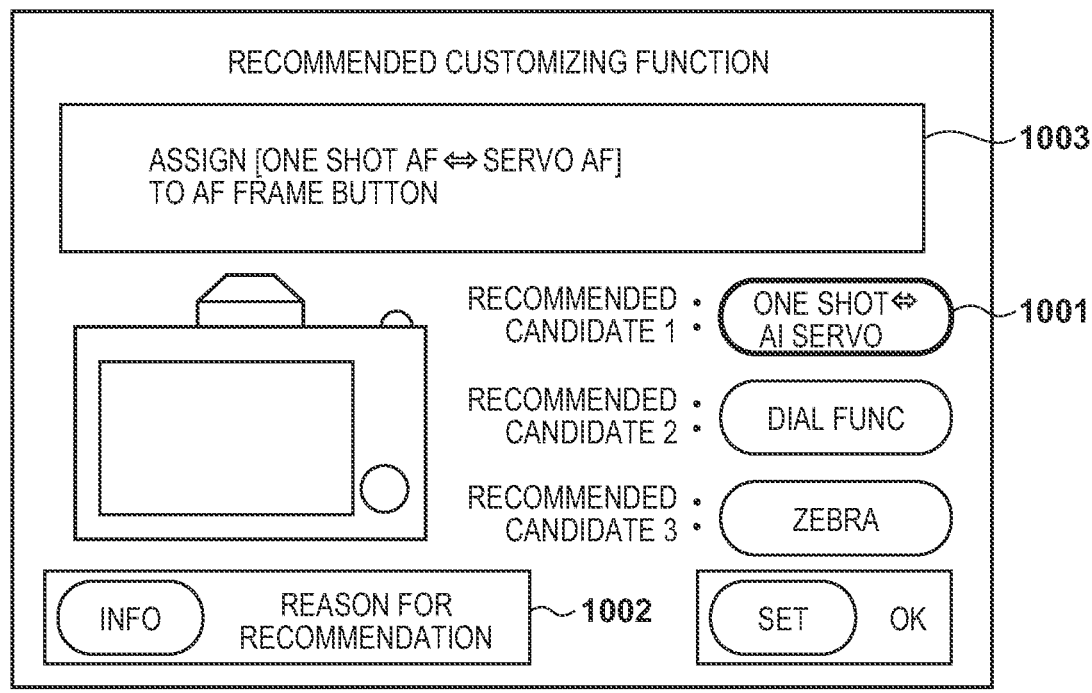
FIG. 10 is a diagram illustrating a setting screen for a customizing function of the present embodiment.

In step S716, the system control unit 201 causes the UI display control unit 402 to display the screen for setting the customizing function illustrated in FIG. 10 on the backside display unit 101. In FIG. 10, in the screen 1000 for the customizing setting, it is possible to present a plurality of recommended function candidates having a higher priority based on the score calculated by the learned model in the estimation unit 463 as denoted in numeral 1001, to present the reason for the recommendation as denoted in numeral 1002, and to present to which member the function is suitable to be assigned as denoted in numeral 1003.

In step S717, the system control unit 201 determines whether or not a power-off instruction for terminating the processing of the digital camera 10 has been made. When the system control unit 201 determines whether or not the power-off instruction has been made, the processing ends, when the system control unit 201 determines that the power-off instruction has not been made, the processing returns to step S701.

When an abnormal operation such as rotation of a mode dial or the like is performed in the processing of FIGS. 7A and 7B, the processing may be interrupted halfway through the processing.

Figure 8:
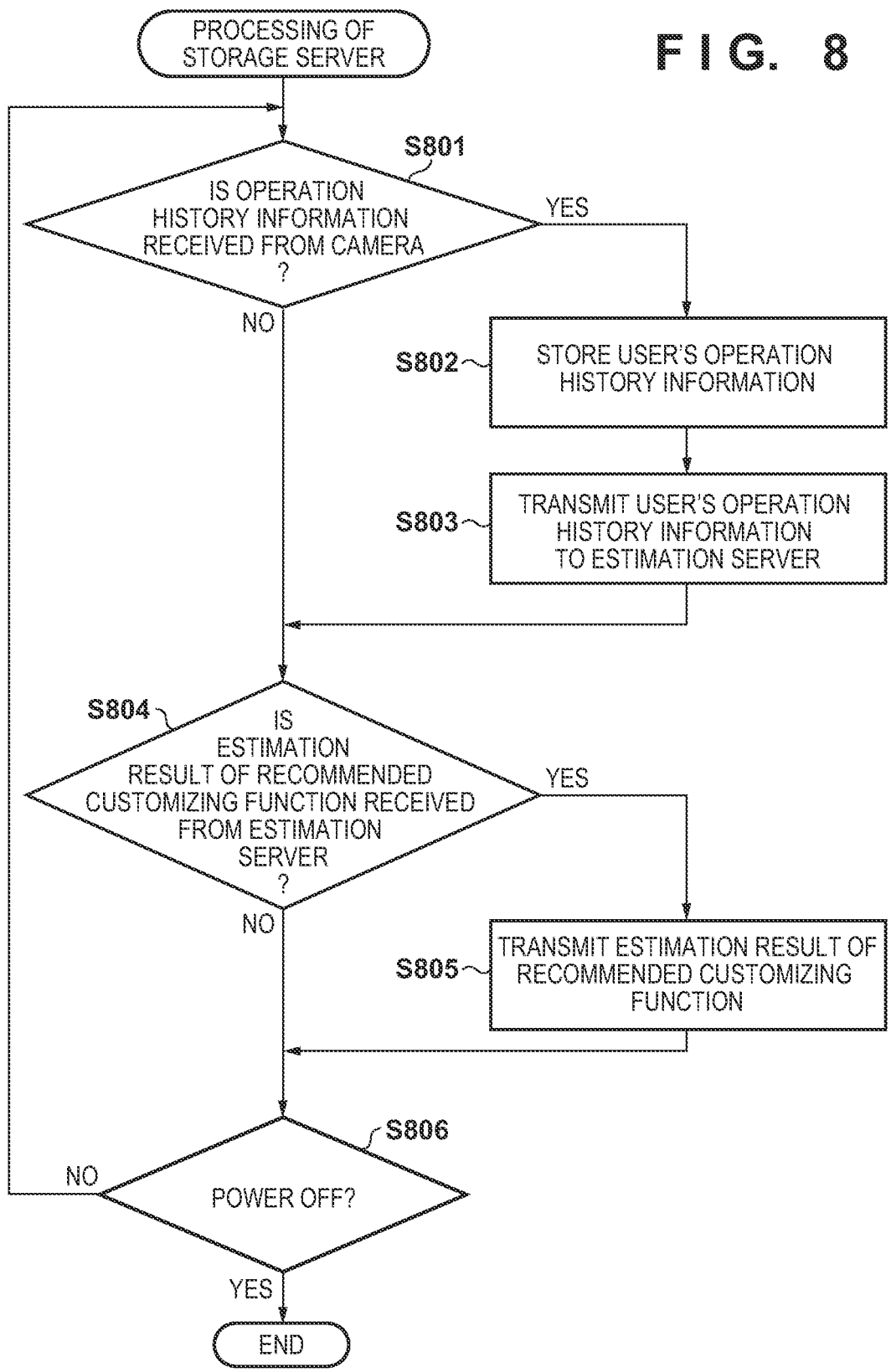
FIG. 8 is a flowchart illustrating processing of a storage server according to one or more aspects of the present disclosure.

FIG. 8 is a flowchart illustrating processing of the storage server 20 in the processing procedure of FIG. 6.

The processing of FIG. 8 is realized by the control unit 302 of the information processing apparatus 300 expanding and executing a program stored in the nonvolatile memory 303 in the work memory 304, and controlling each component of the storage server 20.

In step S801, the control unit 302 determines whether or not the operation history information has been received from the digital camera 10. When the control unit 302 determines that the operation history information has been received from the digital camera 10, the processing proceeds to step S802, and when the control unit 201 determines that the operation history information has not been received from the digital camera 10, the processing proceeds to step S804.

In step S802, the control unit 302 stores the operation history information received from the digital camera 10 by the data storage unit 451 in the work memory 304.

In step S803, the control unit 302 transmits the operation history information to the estimation server 30 by the data managing unit 452.

In step S804, the control unit 302 determines whether or not the recommended customizing function, which is the estimation result transmitted from the estimation server 30, has been received. When the control unit 302 determines that the estimation result has been received from the estimation server 30, the processing proceeds to step S805, and when the control unit 302 determines that the estimation result has not been received from the estimation server 30, the processing proceeds to step S806.

In step S805, the control unit 302 transmits the recommended customizing function, which is the estimation result received from the estimation server 30, to the digital camera 10 by the data transmission/reception unit 453.

In step S806, the control unit 302 determines whether or not the power-off instruction for terminating the processing has been made. When the control unit 302 determines that the power-off instruction has been made, the processing ends, and when the control unit 302 determines that the power-off instruction has not been made, the processing returns step S801.

If an abnormal operation is performed in the processing of FIG. 8, the processing may be interrupted halfway through the processing.

Figure 9:
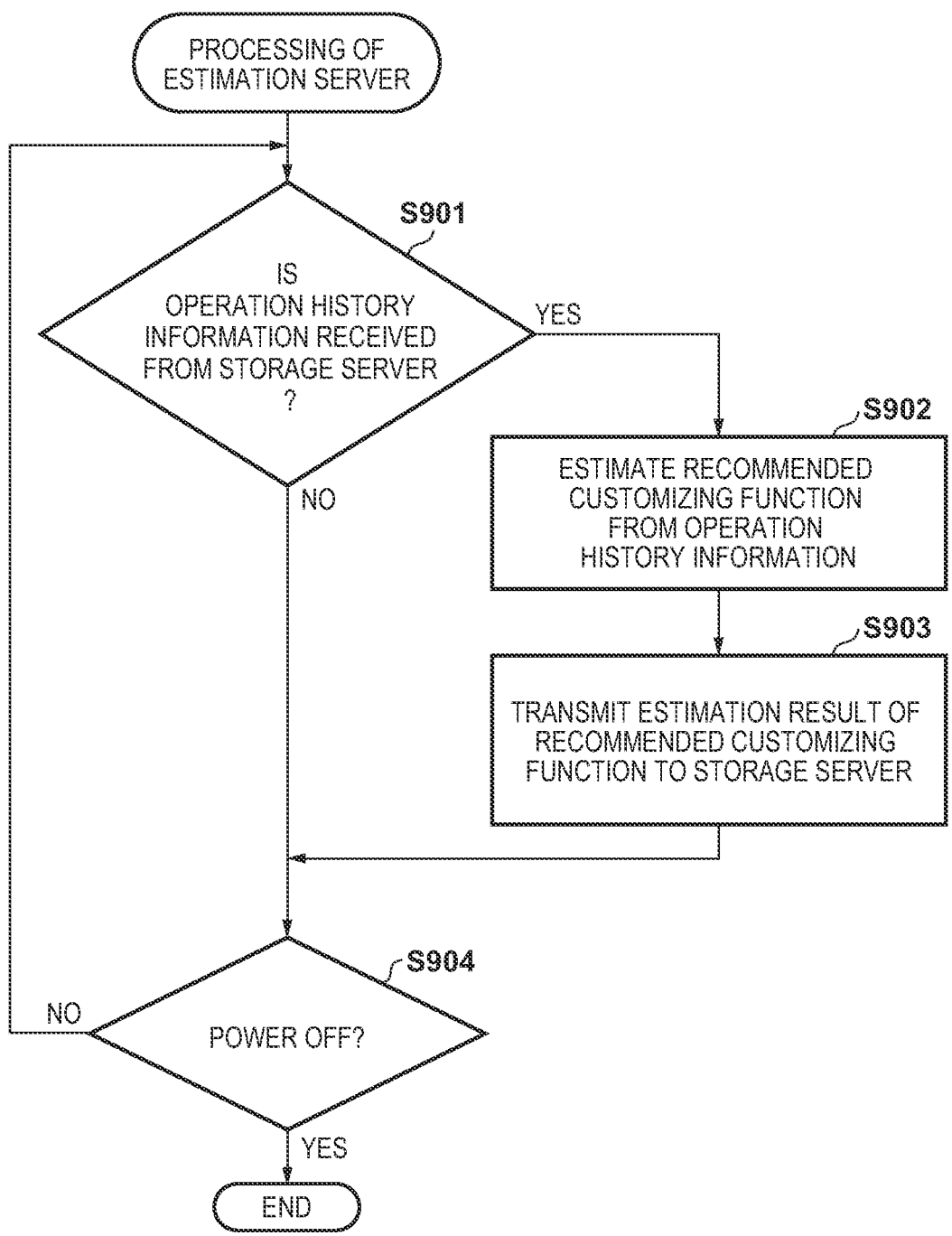
FIG. 9 is a flowchart illustrating processing of an estimation server according to one or more aspects of the present disclosure.

FIG. 9 is a flowchart illustrating processing of the estimation server 30 in the processing procedure of FIG. 6.

The processing of FIG. 9 is realized by the control unit 302 of the information processing apparatus 300 expanding and executing a program stored in the nonvolatile memory 303 in the work memory 304, and controlling each component of the estimation server 30.

In step S901, the control unit 302 determines whether or not the operation history information has been received from the storage server 20. When the control unit 201 determines that the operation history information has been received from the storage server 20, the processing proceeds to step S902, and when the control unit 201 determines that the operation history information has not been received from the storage server 20, the processing proceeds to S904.

In step S902, the control unit 302 causes the estimation unit 463 to execute the estimation processing of the recommended customizing function based on the operation history data received in step S901. As described above, the estimation unit 463 executes the estimation processing by using the learned model in which the combination of the customizing function with respect to the operation history information prepared by the highly skilled user is learned in advance as supervisory data in the learning unit 462. This can find the problem which the user has from the operation history information of the user, and the optimal customizing function can be presented. This can achieve an effect that is equivalent to that of proposing the zebra function as a solution by a highly skilled user to a user who is in trouble with the highlight-detail loss images, for example.

Although the estimation unit 463 executes the processing using the learned model that has been machine-learned, or may execute a rule-based processing such as a look-up table (LUT). When the LUT is used, for example, the relationship between the images and the attendant information and the improvement effect may be generated in advance as the LUT, and the generated LUT may be stored in the data storage unit 461. The estimation unit 463 can acquire the output data with reference to the LUT stored in the data storage unit 461. In other words, the LUT implements the above-described processing by operating in cooperation with the control unit 302, the arithmetic unit 309 and/or the like as a program for executing the processing equivalent to the processing of the estimation unit 463.

In step S903, the control unit 302 transmits the recommended customizing function, which is the estimation result in the estimation unit 463, to the storage server 20.

In S904, the control unit 302 determines whether or not the power-off instruction for terminating the processing has been made. When the control unit 302 determines that the power-off instruction has been made, the processing ends, and when the control unit 302 determines that the power-off instruction has not been made, the processing returns to step S901.

When an abnormal operation such as rotation of a mode dial or the like is performed in the processing of FIGS. 7A to 9, the processing may be interrupted halfway through the processing.

When an abnormal operation is performed in the processing of FIG. 9, the processing may be interrupted halfway through the processing.

As described above, according to the present embodiment, the recommended customizing function relating to the shooting function is estimated based on the operation history information including the shot image information, and the result of estimating the operation member suitable for the recommended customizing function is presented to the user. As a result, even a user who does not know the content of the function can assign an appropriate function to an appropriate member, and can shoot better still images and/or moving images.

In the present embodiment, although an example in which the digital camera 10, the storage server 20 and the estimation server 30 share the respective processing and controls has been described, all the processing may be executed by one hardware, or the entire control may be performed by sharing the processing by a plurality of hardware.

Further, although the present invention has been described in detail based on suitable embodiments thereof, the present invention is not limited to these specific embodiments, and various modifications within the scope that is not departing from the gist of the present invention are also included in the present invention. Further, the above-described embodiment is merely one embodiment of the present invention, and it is also possible to appropriately combine the respective embodiments.

In the embodiment described above, the present invention has been described with reference to a case of applying to an image capture apparatus such as a digital camera and an information processing apparatus such as a server computer, but is not limited to this example, it is applicable as long as the apparatus includes a camera function. That is, the present invention is also applicable to personal computers, tablet terminals, or mobile phones, smart phones which are kinds of the mobile phones, or the like having a camera function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-085497, filed May 14, 2020 which is hereby incorporated by reference herein in its entirety.

What is claimed is:

1. An information processing apparatus comprising a memory and at least one processor which function as:
   an acquisition unit configured to acquire shot image information from an image capture apparatus having a customizing function for assigning a predetermined shooting function to a predetermined operation member; and
   an estimation unit configured to estimate the customizing function to be recommended to a user based on the shot image information acquired from the image capture apparatus,
   wherein the shot image information includes operation history information of a shooting operation of a user, and
   the estimation unit calculates a score based on a model obtained by learning using information in which a relationship between the shot image information, the operation history information, and the shooting function assigned to the operation member is associated with each other.

2. The apparatus according to claim 1, further comprising:
a storage unit configured to store the shot image information acquired from the image capture apparatus, and
a transmission unit configured to transmit an estimation result of the customizing function to be recommended to the user to the image capture apparatus.

3. The apparatus according to claim 1, wherein the learning of the model is executed by reflecting or without reflecting the operation history information of the user.

4. The apparatus according to claim 1, wherein the estimation result of the estimation unit includes a plurality of shooting functions that can be assigned to the operation member, and a reason for recommending the plurality of shooting functions.

5. The apparatus according to claim 1, wherein the operation history information includes shooting setting information.

6. A method of controlling an information processing apparatus, the method comprising:
acquiring shot image information from an image capture apparatus having a customizing function for assigning a predetermined shooting function to a predetermined operation member; and
estimating a customizing function to be recommended to a user based on the shot image information acquired from the image capture apparatus,
wherein the shot image information includes operation history information of a shooting operation of a user, and
in the estimating, a score is calculated based on a model obtained by learning using information in which a relationship between the shot image information, the operation history information, and the shooting function assigned to the operation member is associated with each other.

7. A non-transitory computer-readable storage medium storing a program for causing a computer to execute a method of controlling an information processing apparatus, the method comprising:
acquiring shot image information from an image capture apparatus having a customizing function for assigning a predetermined shooting function to a predetermined operation member; and
estimating a customizing function to be recommended to a user based on the shot image information acquired from the image capture apparatus,
wherein the shot image information includes operation history information of a shooting operation of a user, and
in the estimating, a score is calculated based on a model obtained by learning using information in which a relationship between the shot image information, the operation history information, and the shooting function assigned to the operation member is associated with each other.

* * * * *